(12) United States Patent
Neale et al.

(10) Patent No.: US 6,335,807 B1
(45) Date of Patent: Jan. 1, 2002

(54) SCANNER CARRIAGE STOP/START ARTIFACT SUPPRESSION SYSTEM AND METHOD

(75) Inventors: Timothy E. Neale, Hampstead, NH (US); Thomas P. Brady; Dean E. Demers, both of Methuen, MA (US); Peter A. Titcomb, Windham; Nicholas W. Nardo, Salem, both of NH (US); Mary Ann Werbinski, Methuen, MA (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 09/201,237

(22) Filed: Nov. 30, 1998

(51) Int. Cl.[7] .................................................. H04N 1/04
(52) U.S. Cl. ........................ 358/486; 358/412; 358/404; 358/444
(58) Field of Search ................................ 358/486, 412, 358/442, 404, 444, 413, 474

(56) References Cited

U.S. PATENT DOCUMENTS

| 5,025,483 A | | 6/1991 | Dinan et al. ................ 382/318 |
|---|---|---|---|
| 5,239,387 A | * | 8/1993 | Stein et al. .................. 358/444 |
| 5,517,331 A | * | 5/1996 | Murai et al. ................. 358/486 |
| 5,572,335 A | * | 11/1996 | Stevens ....................... 358/442 |
| 5,690,406 A | | 11/1997 | Furukawa et al. ............. 353/25 |
| 5,726,762 A | * | 3/1998 | Akada et al. ................ 358/401 |
| 5,760,727 A | | 6/1998 | Lin ............................. 341/155 |
| 5,801,839 A | * | 9/1998 | Ochiai ......................... 358/404 |

* cited by examiner

Primary Examiner—Cheukfan Lee
(74) Attorney, Agent, or Firm—Robert A. Sabourin; Joseph D. King

(57) ABSTRACT

A scanner, utilizing a local buffer, prevents the occurrence of stop/start artifacts in the image data by selecting a scan rate that will not overflow the buffer. This is accomplished by having the host computer communicate to the scanner to instruct a modification to a default scanning speed. The modification is based upon an expected rate at which the host computer can consume the image data, prior to the beginning of the document scan. Consequently, the scanner does not generate image data faster than they can be accepted by the host computer, thus avoiding the need to stop the relative movement between the image sensor and the document.

12 Claims, 3 Drawing Sheets

SCANNER CARRIAGE STOP/START ARTIFACT SUPPRESSION SYSTEM AND METHOD

BACKGROUND OF THE INVENTION

Scanners are used to digitize the graphic content, be it color or black and white photographs, artwork, text, or other graphics, from reflective and/or transmissive original documents. The generated image data is then usually passed to a host computer.

The scanner functionality is useful in digital document storage, digital content generation, and in more industrial printing environments. In this latter implementation, chemical film-based photographs, for example, can be digitally scanned for pre-print review, followed by production printing.

One of the most common scanner configurations is the flat-bed scanner. A transmissive or reflective original document is placed face-down on a bed having a glass plate. A carriage, under the glass plate, with a slit aperture facing the document is then scanned over the original document. An optical system in the carriage successively picks-off scan lines. Fold mirrors relay the scanned lines to the optical system's imaging lens, which image the scan lines onto a linear or two-dimensional image sensor. In one common implementation, the image sensor is a trilinear, charge-coupled device (CCD) array, although it appears that newer CMOS-based image sensors will become increasingly popular.

Sheet-feed scanners are very similar to the flatbed scanner configuration. The major difference concerns the fact that the relative movement between the image sensor and the original document is accomplished by scanning or moving the document over a stationary image sensor.

Regardless of the scanner configuration, the image sensor is used to detect light from the, typically, actively-illuminated document and generates analog pixel signals corresponding to the quantity of light received by each light sensitive element in the sensor. These analog signals are passed to an analog-to-digital converter, which generates the respective image data. This image data is then transferred to the host computer where it is ultimately used in a desktop-publishing application, for example, running on the host computer.

A recurrent issue that arises in these scanner-host computer systems is the data transmission channel between the scanner and the host computer. As a general rule, the scanner generates image data faster than it can be received, or consumed, by the host computer. The limitation concerns the host computer's architecture. Although the physical data channel, typically a SCSI (small computer systems interface) bus, can transmit the data as fast as it can be produced by the scanner, the host computer must store the data to its hard drive, possibly after processing the data.

Three general approaches are pursued in managing this discrepancy between the speed at which the scanner produces data and the maximum speed at which the host computer can consume that data.

The most common approach is to place a first-in-first-out (FIFO) buffer in the scanner on the data channel to the host computer. The scanner generates the image data during the scan, and the data are passed to the buffer, while older data are simultaneously leaving the buffer for transfer to the host computer. This approach is relatively inexpensive since the provision of the local scanner buffer is inexpensive, in most situations. This scanner-buffer also has the advantage that the overall speed of the scanning operation is relatively quick. The total time to scan a given document is approximately the time to transfer the data to the host computer. One disadvantage, however, concerns the quality of the image data. As the buffer becomes full, the relative movement between the document and the image sensor must be stopped so that image data is no longer produced, thereby allowing the buffer to empty, essentially enabling the host computer to catch-up. When document scanning is resumed, the conditions under which the first part of the scan was performed must be precisely duplicated. For example, scanning in the document must be restarted at precisely the position where it was stopped. Moreover, lighting, relative transfer speed, and CCD sensitivity must be exactly the same as they were prior to the scanning stop. Any small differences will result in an artifact extending across the image data transverse to the direction of document scanning. These are referred to as carriage stop/start artifacts. For high quality scanners, such artifacts, even if very minor in nature, are unacceptable.

The second approach is to buffer all of the image data on the scanner. Typically, to provide the necessary storage, a hard disk drive is placed locally on the scanner and the image data generated by the scanner is first stored directly to that scanner-local hard drive. The disadvantages here are the costs associated with the extra-local-scanner hard drive and the overall time to complete a scan. Image scanning and data transfer to the host computer are strictly serialized. Thus, the time for a scan is equivalent to the time to scan plus the time to transfer the data. Advantageously, stop/start artifacts can be avoided since storage to the drive can track image data generation.

Finally, some have proposed to slow down the speed of the scan and thus the rate at which the image data are generated, so that the number of times that the buffer overflows is minimized to thereby reduce the number of stop/start artifacts in the scanned image. This has the advantage in reducing the time to scan the document to approximately the time to transfer the data to the host computer, while yielding a relatively inexpensive system, i.e., a scanner with a small buffer size.

SUMMARY OF THE INVENTION

Each of the above-identified techniques for managing the data transfer between the host computer and the scanner has their associated problems. Local disk storage slows down the time to perform the scan and increases the cost of the scanner due to the local disk drive. Advantageously, it avoids the problem of the stop/start artifacts. The other two approaches have the problem of still having start-stop artifacts, but they are relatively less expensive to implement.

The present invention is directed to a scanner that preferably utilizes a local buffer, rather than a hard disk drive. Thus, it avoids the associated cost of the drive. It, however, almost entirely prevents the occurrence of stop/start artifacts in the image data by selecting a scan rate that will not overflow the buffer. This is accomplished by having the host computer communicate to the scanner to suggest a modification to the scanning speed based upon an expected rate at which the host computer can consume the image data, prior to the beginning of the document scan. As a result, the scanner does not generate image data faster than they can be accepted by the host computer, thus avoiding the need to stop the relative movement between the image sensor and the document.

In general, according to one aspect, the invention features an image scanning system. The system comprises a scanner that generates image data and has a buffer for temporarily storing the image data prior to transfer. A host computer receives the image data from the buffer and signals the scanner, preferably prior to the beginning of image scanning, to modify a scanning speed based upon an expected rate at which the host computer can accept the image data.

In preferred embodiments, the host computer generates scanning speed modification data, which are sent to the scanner to affect its scan speed, in response to a processing overhead during the image data transfer from the scanner. In most cases, this processing overhead results from image processing that the host computer must perform on the image data prior to their storage in the host computer's hard drive.

In more detail, in the preferred embodiment, the scanner stores a default scanning speed in a non-volatile.memory The speed at which a current scanning operation is performed is calculated based upon the scanning speed modification data from the host computer and the default scanning speed. This default scanning speed can be the same for all scanners, ie. factory set, or it can be set based upon the computational power of the host, or its data handling capabilities, such as its hard drive speed, during a scanner installation process.

In general, according to another aspect, the invention also relates to an image scanner. This image scanner comprises an image sensor that detects light from a document. A carriage scans the image sensor relative to a document to be scanned and an analog-to-digital converter converts image signals from the image sensor to the image data. A buffer is used to temporarily store the image data prior to transfer to a host computer. The scanner's controller selects a scanning speed of the carriage based upon scan speed data sent from the host computer, which is intended to limit the speed at which the scan takes place so that the buffer does not overflow, which would necessitate carriage stop/start during the scan.

Finally, according to still another aspect, the invention features a document scanning method for suppressing carriage stop/start artifacts in the image data. The method comprises determining image data processing overhead at a host computer and then generating carrier scan speed data based upon the image data processing overhead. The scan speed data are then sent to the scanner, which then controls a speed of carriage translation in response to the data.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention. Of the drawings.

DETAILED DESCRIPTION OF THE INVENTION

Figure 1:
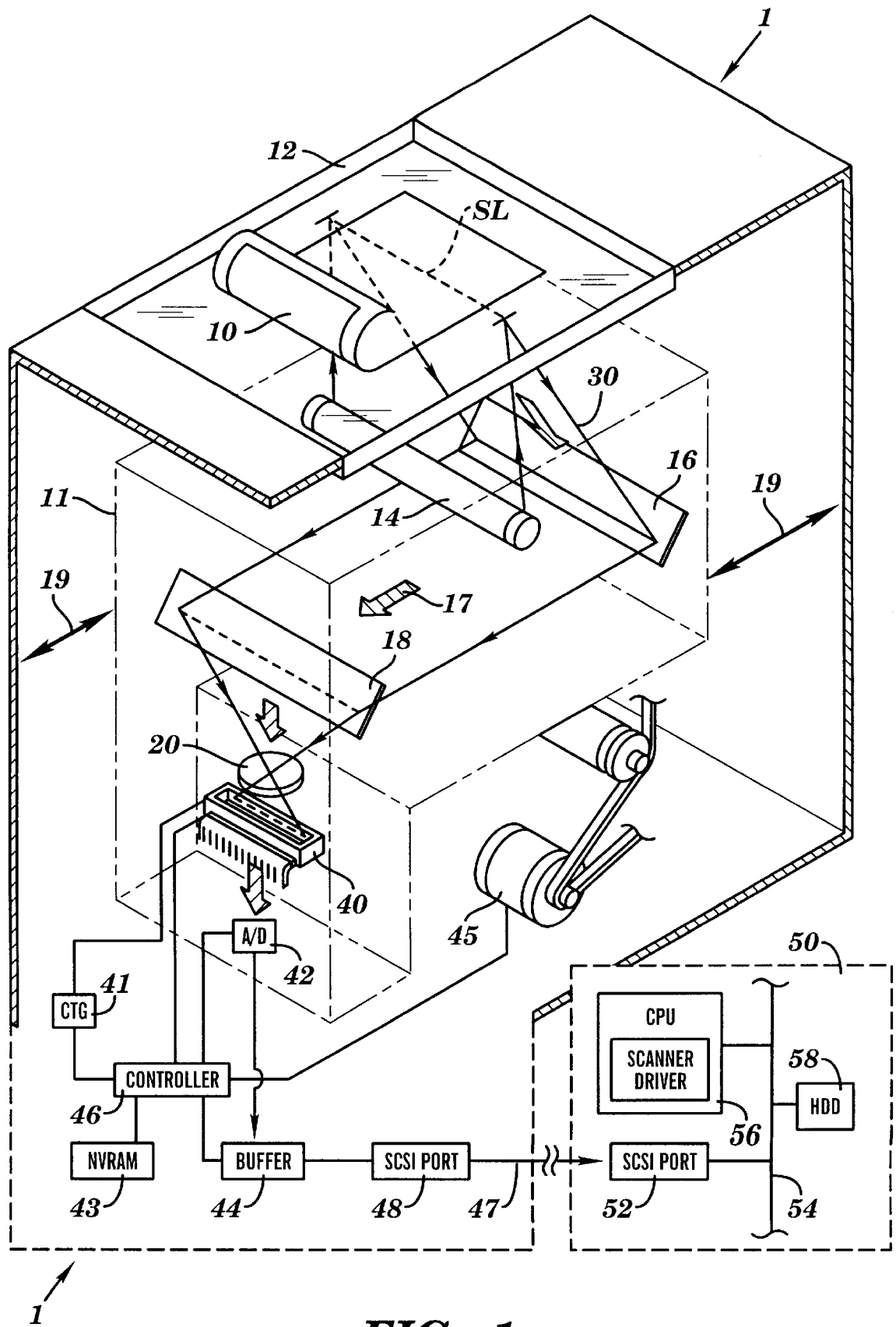
FIG. 1 is a schematic view illustrating the internal components of one embodiment of a scanner and host computer which are built and operate in accordance with the principles of the present invention.

FIG. 1 shows an image scanning system that has been constructed according to the principles of the present invention. Generally, it comprises a scanner 1 and a host computer 50.

The scanner 1 is shown in a flat-bed configuration. The original document 10 is placed face-down on a typically glass reference surface 12. A carriage 11 is then scanned under the original document 10 so that scan lines SL can be successively picked off along the length of the document 10. The carriage is driven by a carriage drive motor 45.

The carriage 11 comprises a light source 14 for illuminating the scan line SL. A first fold mirror 16, also in the carriage, picks off the scan line SL and relays it to a second fold mirror 18 as illustrated by arrow 17. Successive scan lines are picked off by translating the carriage 11 in the direction of arrow 19, along the direction of the Y-axis. The second fold mirror 18 relays the light from the scan line SL to a focusing lens 20, which forms an image of the scan line SL on image sensor 40. In the typical implementation, this image sensor 40 is a CCD array. In an alternative embodiment, it can be a detector based upon CMOS technology.

In the preferred embodiment, illustrated in FIG. 1, a flatbed configuration is shown in which the image or document 10 is held stationary on the reference surface while the carriage, containing the optical system is moved relative to the document. The present invention is equally applicable to sheet feeder-type scanners where the optical system is held in a stationary position, while the document is scanned over it. The invention is applicable to scanning either reflective or transmissive images.

The image signals, generated by the image sensor 40, are passed to an analog-to-digital converter 42 under the control of a CCD timing generator (CTG) 41 and scanner controller 46. The A/D converter 42 converts the image signals into image data which are held in a first-in-first-out buffer (FIFO) 44 prior to transfer across the data channel 47 to the host computer.

In the illustrated embodiment, two SCSI ports 48, 52, one in the scanner, and a second in the host computer 50 manage the physical layer data transfer. Once the image data are received at the host computer SCSI port, they are sent out onto the data bus 54 of the host computer to CPU 56. The CPU 56 performs any image processing operations on the data prior to its storage in hard drive 58.

In the past, if the buffer 44 became full because of an inability of the host computer 50 to accept image data, the controller 46 would detect the full or nearly full buffer and trigger a stop/start. During stop/start, the motion of the carriage 11 is arrested relative to the original 10 by operation of the carriage translation motor 45 under the control of the controller 46.

In many instances, the stop/start routine led to the generation of artifacts in the image data. These artifacts were caused by or associated with the difficulty to duplicate the scanning parameters just prior to the stop relative to just after the restart. For example, the illumination source may have become hotter or cooler due to its movement, or on-time, thus causing it to create different lighting conditions. Mechanical instabilities in the optical system could change the manner in which the image was formed on the CCD 40. The carriage may not be placed at the precise location where the stop occurred, leaving a potential gap or overlap in the image data. Further, the carriage may not be moving at precisely the same speed just prior to the stop as just after the restart due to inertial effects, for example.

Any of small changes in the scanning parameters leads to sharp discontinuities in the image data at the position of the stop/start. In many scanners, in a continuous scan, these variables lead only to small changes over the entire length of the scanned image. In a stop/start situation, these dynamics create sharp discontinuities, which can be resolved by the human eye.

Figure 2:
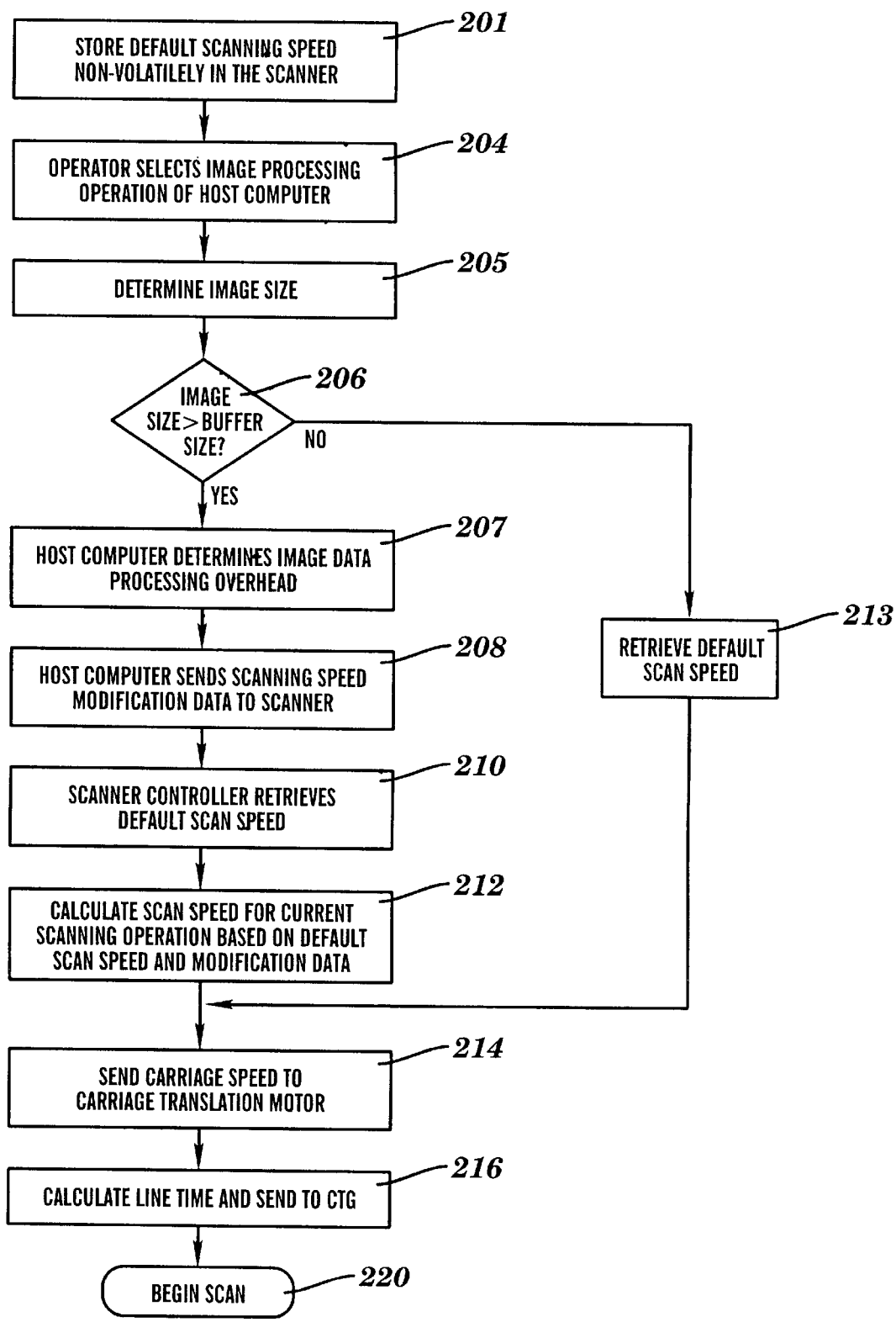
FIG. 2 is a flow diagram illustrating one method of operation a scanning system in accordance with the principles of the present invention.

FIG. 2 shows a document scanning method according to the principles of the present invention, which prevents or in most cases negates stop/start artifacts.

First, in step 201, a default scanning speed is stored non-volatilely in the scanner 1 in nonvolatile RAM 43, which is accessible to the controller 46. This default scanning speed is usually stored in the scanner 1 prior to leaving the factory, i.e., at manufacture.

In other embodiments, the default scanning speed is generated by the host computer 50 and stored to the NVRAM 43 as part of a scanner installation process, when the scanner is first connected to the computer 50. In the typical installation process, the scanner's software drivers, running on the host computer's CPU 56, calculate a default scanning speed based upon the compute power of the host computer 50. Typically, this is a function of the speed of the host computer's CPU 56. The default processing speed is also preferably a function of the hard disk drive 58 of the host computer 50. Many times, the speed at which the hard drive runs is a large determining factor in how fast the host computer can receive and store data from the scanner 1.

At the beginning of a given scanning operation, the host computer operator first selects an image processing operation to be performed by the host computer as part of the document image scan in step 204. Many times, minimal image processing operations are selected. As a result, the host computer 50 will do little more than receive the image data from the scanner and store it to the hard drive 58. The host computer always executes a certain amount of processing on the incoming image data, even when operations are selected. Other times, however, such operations as image dynamic range adjustment, input and edit profiles, shadow/highlighting, and other Look Up Table (LUT) operations are performed, in addition to the scanning.

The scanner 1 then determines the image size, i.e., that is the total image data that will be generated by the scan, in step 205. This is dependent upon whether only a portion, or the entire of the document 10, is being digitized and the resolution used.

Then in step 206, the amount of image data to be generated is compared to the size of the buffer 44. If the total amount of image data are less than the size of the buffer 44, the scan speed will not be reduced in subsequent steps since overflow is not a risk. Thus, in step 213 the default scan speed is retrieved from the NVRAM 43. However, if the image size is bigger than the FIFO 44 size, then the scan speed is calculated.

Image processing operations require a certain image data processing overhead of the host computer 50. Typically, many tens or hundreds of machine cycles can be required to process each pixel from the scanner 1 during the scanning operation. This assessment in made in step 207 by the host computer.

Based upon the determined level of image processing overhead that is required from the host computer 50 to process the image data, the host computer 50 generates scanning speed modification data, which are then sent to the scanner 1 in step 208.

The scanner 1 receives the speed modification data from the host computer via the data transmission channel 47. At this time, the scanner controller 46 also retrieves the default scan speed from the nonvolatile RAM 43 in step 210.

In step 212, the scanner 1 calculates the scan speed for the current scanning operation. This calculated scan operation is based upon the default scan speed and the modification data from the host computer 50.

The controller 46 signals the carriage translation motor 45 to drive the carriage at this calculated speed or default speed, if the buffer was greater than the total amount of image data, in step 214. The controller 46 also signals the CTG 41 what the line time or line exposure time will be in step 216. The CTG 41 then programs the CCD 40 to execute this selected exposure. The scanning operation is then initiated.

IMAGE PROCESSING TIMINGS

To qualify the overhead for various image processing functions, a system based on a PC configuration running a Gateway G6-200 processor with Windows NT® operating system, 160 Mb of RAM, and configured for 512 Kb SCSI transfers was tested. A reference scan at 545 dots per inch with an image that was 6.25 inches wide and 4.5 inches high, generating 48 Mb of image data, was executed by the scanner and written to the hard drive of the host computer. The image contains 8 megapixels. The following table shows the total time, and extra time required (in seconds) to perform the transfer with a variety of image processing functions.

TABLE 1

| Test Description | Total Time | Extra Time |
| --- | --- | --- |
| No image processing | 59 sec. | — |
| Dynamic Range Adjustment | 59 | 0 sec. |
| Output as 8 bit RGB (2 Bitdepth Conversions) | 63 | 4 |
| Color Conversion | 70 | 11 |
| LUT1 | 66 | 7 |
| LUT2 | 64 | 5 |
| LUT3 | 65 | 6 |
| LUT4 | 65 | 6 |
| Selective Color | 70 | 11 |
| Sharpening 1 | 76 | 17 |
| Sharpening 2 | 80 | 21 |
| Descreening 1 | 125 | 66 |
| Descreening 2 | 139 | 80 |
| Descreening 3 | 158 | 99 |

In the preferred embodiment, the scan speed modification data provided by the host computer to the controller 46 are based upon the extra time required to perform the specific image processing functions identified in Table 1. The data indicate a slower scan time, which is a function of the extra time required for the processor to complete the various functions before the image data are stored to the hard drive 58.

In the embodiment in which the default scan speed is not factory-set, but set during installation, it is important to set the default speed based upon the specific computer system used. As illustrated by the following three systems, and summarized in Table 2, the time to perform various image processing functions was affected by the particular capabilities of the host computer.

System 1 is a Power Macintosh 9600/300 running System 7.6.1 at 300 MHZ. This computer has 128 Mb of RAM and is configured for 512 Kb SCSI transfers. An internal IBM DCAS-34330 SCSI drive was used for storage (5400 rpm, shared 512 Kb read/write cache).

System 2 is a Power Computing Power Tower Pro 200 running System 7.5.5 at 200 MHZ. This computer has 128 Mb of RAM and is configured for 512 Kb SCSI transfers. An internal Seagate SJ 3217N SCSI drive was used for storage (7200 rpm, 512 Kb read cache).

System 3 is a Gateway 2000 G6-200 workstation running Windows NT at 200 MHZ. The computer has 160 Mb of RAM and is configured for 512 Kb SCSI transfers. An internal Western Digital WDC AC33 100H EIDE drive was used for storage (5200 rpm, 128K read/write cache).

TABLE 2

|  | System1- 300 MHZ Power Mac | System2- 200 MHZ Power Computing | System3- 200 MHZ Gateway 2000 |
| --- | --- | --- | --- |
| CMYK w/o edits | 99/-sec.- | 72/-sec. | 67/-sec. |
| CMYK w/edits | 118/19 | 101/29 | 109/42 |
| CMYK & descreen | 128/29 | 119/47 | 167/100 |
| CMYK w/all edits | 147/48 | 147/75 | 205/138 |

For System 2 according to Table 2, the total time to scan and store the CMYK reference scan image without additional processing is 72 seconds. The total time to scan and process the CMYK reference scan image with descreening is 119 seconds, which includes 47 seconds for descreening.

CALACULATION OF SCAN RATE ADJUSTMENT

The scan rate calculation can be derived by considering the situation in which, during the course of a scanning operation, image data is being generated and simultaneously sent to the host computer. Because the rate of host-transfer is less than the rate at which image data is being produced, the FIFO 44 is gradually filling-up. The maximum speed of image data production that would avoid FIFO overflow is that which would cause the FIFO to be exactly full at the end of the scan. The contents of the FIFO can then be sent to the host computer without interfering with the scanning operation. In order for this situation to occur, it is necessary to determine the amount by which the total image size exceeds the FIFO size to be transferred to the host computer during the scanning operation. In other words, the host transfer rate must be sufficient so that at least the difference between the FIFO and image is transferred during the scan.

| | |
| --- | --- |
| Amount Transferred During Scan = | Image Size–FIFO Size |
| Scan Time = | Image Size/Scan Rate |

Then, since, in general, Rate=Amount/Time:

Host Rate=(Image Size−FIFO Size)/(Image Size/Scan Rate)

To determine the Scan Rate for a given Host Rate, solve for Scan Rate:

Scan Rate=(Host Rate*Image Size)/(Image Size−FIFO Size)

This formula gives the maximum scan rate that will not provoke a stop/start, for a given host rate. The scan rate should be set somewhat lower than this, to provide some margin of safety. The actual scan rate, or the default rate as decreased by speed modification data from the host computer, should be set somewhat lower than this, to provide some margin of safety.

Figure 3A:
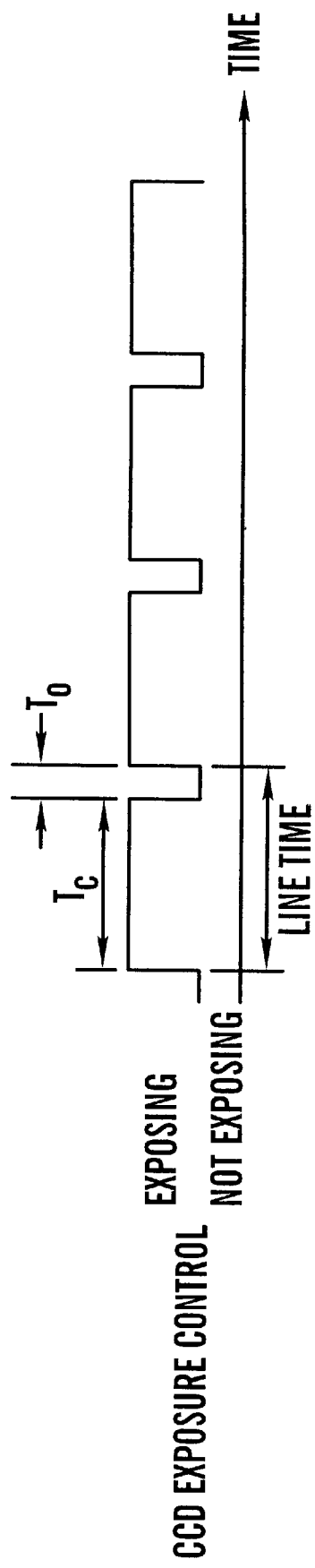
FIG. 3A is a prior art timing diagram illustrating the relationship between exposure times and line times.
Figure 3B:
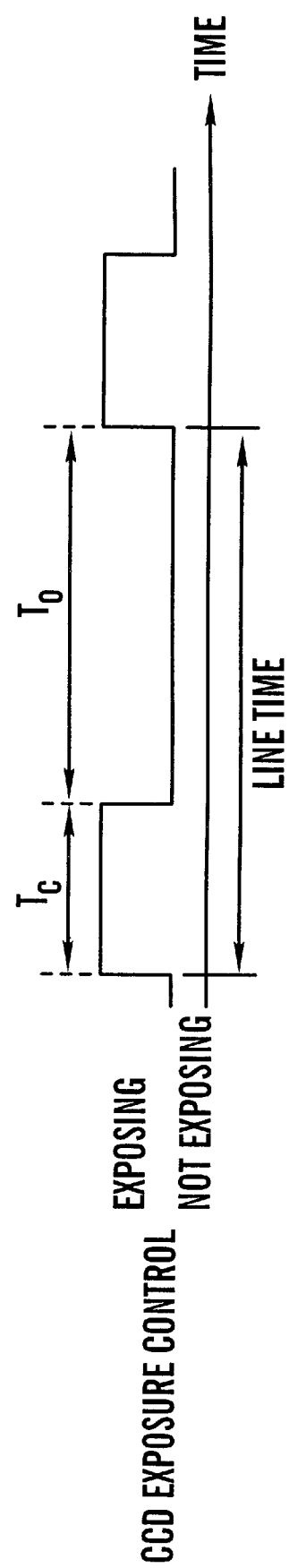
FIG. 3B is a timing diagram illustrating the relationship between exposure times and line times in accordance with the principles of the present invention.

FIGS. 3A and 3B illustrate the resulting disconnection between the line times and the exposure time executed by the CCD 40 when the present invention is implemented.

FIG. 3A shows a typical prior art relationship between the line times ($T_c$ and $T_o$) and the exposure time $T_c$. The difference $T_o$ between the exposure time $T_c$ and the line time is only a function of the time required by the data processing path to move the image signals from the CCD 40 through the A/D converter 42 to the buffer 44. This results in a fast scan, but as discussed previously, produces image data too quickly for the host computer to receive.

As illustrated in FIG. 3B, the line times ($T_c$ and $T_o$) are extended substantially to create modified line times by slowing the carriage translation. The exposure time $T_c$, however, remains constant. Thus, in the present invention, there is a disconnect between the exposure time $T_c$ programmed into the CCD 40 by the CTG 41 and the total line time ($T_c$ and $T_o$) which is a function of the carriage translation speed executed by the carriage translation motor 45.

While this invention has been particularly shown and described with references to preferred embodiments thereof, it will be understood by those skilled in the art that various form changes in and details may be made therein without departing from the scope of the invention as defined by the appended claims.

What is claimed is:

1. An image scanning system, comprising:
   a scanner comprising a buffer for temporarily storing scanned image data, said scanner scanning the image data and having a scan rate set at a default scanning speed stored in non-volatile memory; and
   a host computer for receiving the image data from the buffer and for signaling the scanner to modify the scan rate based upon (1) an expected rate at which the host computer can consume the image data, and (2) preventing an occurrence of start/stop artifacts in the image data by selecting a scan rate that will not overflow the buffer.

2. An image scanning method, comprising the steps of:
   providing a scanner with a scan rate initially set at a default scanning speed for scanning image data; and
   modifying the scan rate during scanner operation in accordance with (1) an expected rate at which a host computer can consume the scanned image data received from the scanner, and (2) preventing an occurrence of start/stop artifacts in the image data by selecting the scan rate that will not overflow a buffer within the scanner.

3. An image scanning system, comprising:
   a scanner that generates image data and has a buffer for temporarily storing the image data prior to transfer; and
   a host computer that receives the image data from the buffer and that signals the image scanner to modify a scanning speed based on an expected rate at which the image data can be accepted wherein an exposure time of an image sensor is unaffected by said modification of scanning speed.

4. An image scanning system as described in claim 1, wherein scanning speed modification data are sent from the host computer to the scanner prior to a beginning of image scanning.

5. An image scanning system as described in claim 1, wherein scanning speed modification data are generated by the host computer in response to processing overhead encountered during the image data transfer from the scanner.

6. An image scanning system as described in claim 1, wherein scanning speed modification data are generated by the host computer in response to image processing to be performed on the image data as the image data are received by the host computer.

7. An image scanning system as described in claim 1, wherein the scanner stores a default scanning speed non-volatilely, from which a current scanning speed is calculated based on scanning speed modification data that are sent from the host computer.

8. An image scanning system as described in claim 7, wherein the default scanning speed is stored based upon computational power and/or data handling capabilities of the host computer.

9. An image scanning system as described in claim 1, wherein the scanner comprises a document scanning system that moves an image sensor relative to a document to be scanned, the scanner controlling a rate of the relative movement in response to scanning speed modification data that is sent from the host computer.

10. An image scanning system as described in claim 1, wherein the document scanning system comprises a carriage for moving an image sensor relative to the document, which is held on a flat bed.

11. An image scanner comprising:

an image sensor that detects light from a document;

a carriage that scans the image sensor relative to a document to be scanned;

an analog-to-digital converter that converts image signals from the image sensor to image data;

a non-volatile memory storing a default scanning speed;

a buffer that holds the image data from the analog-to-digital converter prior to transfer to a host computer; and a controller that calculates a scanning speed of the carriage based on host processing speed information sent from the host computer.

12. An image scanner as described in claim 11, wherein the default scanning speed is stored based upon computational power and/or data handling capabilities of the host computer determined during an installation procedure.

* * * * *